Patented Mar. 3, 1936

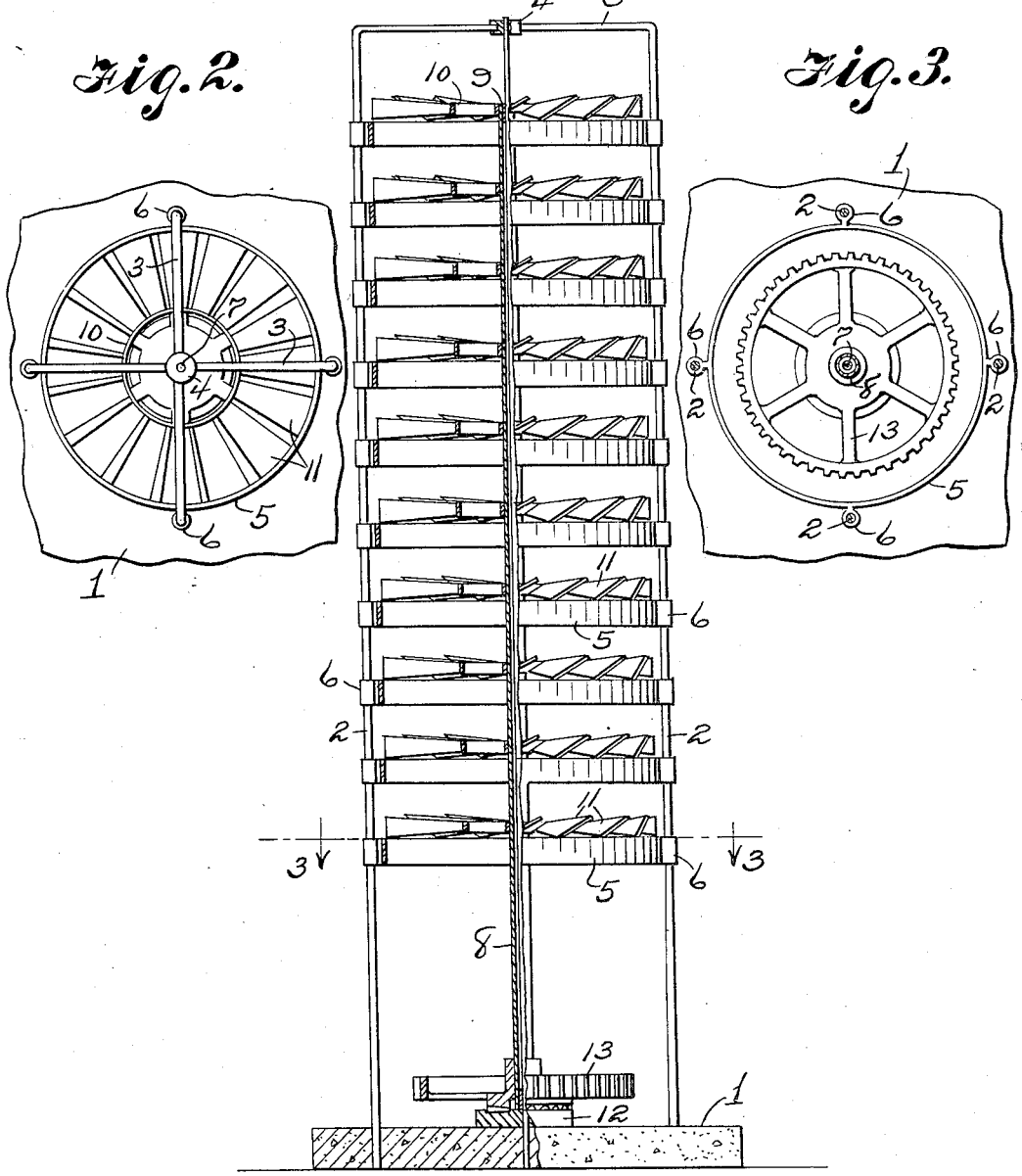

2,032,651

UNITED STATES PATENT OFFICE 2,032,651

WIND MOTOR

Peter T. Donovan, Lucerne Valley, Calif.

Application September 3, 1935, Serial No. 39,016

4 Claims. (Cl. 170—39)

This invention relates to wind motors and its general object is to provide a wind motor that is capable of producing maximum power from minimum velocity of wind or air currents, by employing superimposed wind wheels with means for each wheel for deflecting the currents from their natural course and directing them to the wheels.

A further object of the invention is to provide a wind motor including a tower which not only acts as a supporting means for the wheels but also as a frame in the form of a cage therefor, with the wheels superimposed therein and extending accordingly from adjacent the top thereof to a point considerably below the horizontal center of the tower, so that the wheels are in the path of both the upper and lower air currents.

Another object of the invention is to provide a wind motor that is simple in construction, inexpensive to manufacture, easy to install and extremely efficient in operation and service.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompany drawing wherein like characters denote like or corresponding parts throughout the several views, and in which:—

Figure 1 is a view of the wind motor which forms the subject matter of the present invention, with parts broken away and in section.

Figure 2 is a top plan view thereof.

Figure 3 is a sectional view taken approximately on line 3—3 of Figure 1, looking in the direction of the arrows.

Referring to the drawing in detail, the reference numeral 1 indicates the base of my wind motor which may be formed from concrete or the like, but in any event has embedded therein the lower ends of the uprights 2 of a frame or cage. The uprights are in the form of rods, as shown, and the upper end portions are bent at right angles upon themselves to provide horizontal portions 3 which have their inner ends fixed to a disk block or the like 4 in a manner whereby the horizontal portions radiate therefrom as shown in Figure 2.

The uprights or rods 2 are preferably arranged in diametrically opposite pairs and have secured thereto at equidistantly spaced intervals circular bands 5 that are relatively narrow, and each of the bands are preferably fixed to the rods or uprights 2 through the instrumentality of collars 6 which are formed on or otherwise secured to the outer surface of the bands, as clearly shown in Figure 3.

Extending centrally of the frame and having its lower end fixed within the base 1 and its upper end to the disk block 4 is a center rod 7 which has mounted for rotation thereon a tubular member 8, and the upper end of the member 8 is provided with a bearing 9 for spacing it from the rod.

Keyed or otherwise secured to the tubular member 8 are the hubs 10 of wind wheels, each of which include vanes or blades 11 which radiate from the hubs and increase in width from their connection therewith to the outer ends, as clearly shown in Figure 1. The vanes 11 of each of the wheels are likewise disposed at a transverse inclination with respect to the horizontal and are preferably of a length to terminate at their outer ends in alignment with the inner edges of the bands.

The wheels are likewise mounted in equidistantly spaced relation with respect to each other and in a manner whereby each wheel is provided with a band that is disposed directly below the same.

Mounted on the base 1 is a bearing 12 for a gear 13 which is fixed to the tubular member 8, to take the power therefrom as will be apparent.

While I have stated that the wheels are each fixed to the tubular member, they may be mounted for rotation and in that event the wheels are secured together and at least one wheel is connected with a pulley or gear such as indicated at 13, but regardless of the construction, the wind wheels actuate suitable power take-off means.

In the operation of my wind motor, it will be obvious that the bands deflect the air currents from their natural course and direct the same to the wheels, and the air so directed is accelerated by the currents blowing over and around the bands and wheels, consequently that feature coupled with the multiplicity of wheels and bands disposed in superimposed relation with respect to each other, provides a wind motor that produces maximum power from minimum velocity of wind or air currents.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A wind motor comprising a base, a frame including uprights secured to and rising from said base, horizontal portions formed on the upper ends of the uprights and having their inner ends connected together, tubular means surrounding the center upright for rotation thereon, wheels including vanes mounted at an inclination with respect to the horizontal and secured to the tubular means for disposal in superimposed relation with respect to each other, means for each wheel for directing air currents thereto and disposed below the same, and said air directing means being secured to the frame.

2. A wind motor comprising a base, a center and outer uprights secured to the base and rising therefrom, said outer uprights providing a frame, tubular means mounted for rotation on the center upright, superimposed wheels including hubs secured to the tubular means, vanes extending from the hubs and being transversely inclined with respect to the horizontal, a circular band for each wheel and being secured to the outer uprights directly below its wheel, and power take-off means secured to the tubular means.

3. A wind motor comprising a vertical frame, a plurality of horizontally disposed superimposed wheels, means common and fixed to the axes of the wheels and mounted for rotation in the frame, a circular band for each wheel and having a diameter to fit the circumference thereof, and each band being secured to the frame below its wheel.

4. A wind motor comprising a base, uprights secured to and rising from said base with their upper ends connected together to provide a vertical frame, connected wind wheels rotatably mounted for movement in unison in said frame and including vanes inclined transversely throughout their length, a circular band for each wind wheel for directing air currents thereto and fixed to the frame, and said wheels and their air directing bands being disposed horizontally within said frame and in superimposed relation with respect to each other.

PETER T. DONOVAN.